(12) United States Patent
McGuire et al.

(10) Patent No.: US 8,874,622 B2
(45) Date of Patent: Oct. 28, 2014

(54) FLEXIBLE ORDER OF AUTHORING FOR DATA INTEGRATION SOLUTIONS

(75) Inventors: Kevin Thomas Edward McGuire, Redmond, WA (US); Sergio Silveira Clemente Filho, Kirkland, WA (US); Matthew Carroll, Seattle, WA (US); Cimarron S Ryan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 13/073,212

(22) Filed: Mar. 28, 2011

(65) Prior Publication Data

US 2012/0254259 A1 Oct. 4, 2012

(51) Int. Cl.
   G06F 7/00 (2006.01)
   G06F 17/30 (2006.01)
(52) U.S. Cl.
   CPC ............................. *G06F 17/30557* (2013.01)
   USPC ......................................................... 707/804
(58) Field of Classification Search
   None
   See application file for complete search history.

(56) References Cited

U.S. PATENT DOCUMENTS

| | | | |
|---|---|---|---|
| 6,820,135 B1* | 11/2004 | Dingman et al. | 709/246 |
| 7,139,779 B1 | 11/2006 | Kornelson | |
| 7,779,017 B2 | 8/2010 | Haselden | |
| 7,860,905 B2 | 12/2010 | Bojanic | |
| 2003/0070003 A1* | 4/2003 | Chong et al. | 709/330 |
| 2006/0095447 A1* | 5/2006 | Dickinson et al. | 707/100 |
| 2006/0190501 A1* | 8/2006 | Massironi | 707/203 |
| 2008/0270350 A1* | 10/2008 | Bojanic et al. | 707/2 |
| 2010/0312536 A1* | 12/2010 | Vaal et al. | 703/10 |

OTHER PUBLICATIONS

Microsoft® SQL Server™ 2000 DBA Survival Guide, Second Edition, by Mark Spenik and Orryn Sledge, Publisher: Sams, Publication Date: Oct. 11, 2002, ISBN-10: 0-672-32468-7, pp. 290-327.*
Ericson, "Flexible Authoring in SQL Server "Denali" CTP1—SSIS," Microsoft Tech Net Wiki, Retrieved Dec. 30, 2010, http://social.technet.microsoft.com/wiki/contents/articles/flexible-authoring-in-sql-server-quot-denali-quot-ctp1-ssis.aspx.
Microsoft SQL Server 2008, "SQL Server Integration Services with Oracle Database 10g," Published May 2008.
Donaldson, "Extracting Data From a Flat File With SSIS," ORCS WEB, Retrieved Dec. 30, 2010, http://support.orcsweb.com/KB/a82/extracting-data-from-flat-file-with-ssis-charles-donaldson.aspx.
Bojanic, "External columns vs. output columns?" Microsoft SQL Server Blog, Retrieved Dec. 30, 2010, http://social.msdn.microsoft.com/forums/en-US/sqlintegrationservices/thread/f5fa8785-46cc-44e1-9251-8503d2725523/.
The ADO.NET Object Model, Retrieved Dec. 30, 2010, Copy Attached.

* cited by examiner

*Primary Examiner* — Jay Morrison
(74) *Attorney, Agent, or Firm* — Nicholas Chen; Kate Drakos; Micky Minhas (57) ABSTRACT

A method includes connecting an integration process to a first set of inputs. The first set of inputs may include one or more inputs. The integration process includes one or more data transformation operations using the inputs. The method further includes receiving metadata about one or more of the inputs in the first set of inputs. The metadata about one or more of the inputs in the first set of inputs is cached. The integration process is then connected to a second set of inputs based on the cached metadata about one or more of the inputs in the first set of inputs.

19 Claims, 8 Drawing Sheets

FLEXIBLE ORDER OF AUTHORING FOR DATA INTEGRATION SOLUTIONS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright.COPYRGT. 2011, Microsoft Corp.

BACKGROUND

Background and Relevant Art

Computers and computing systems have affected nearly every aspect of modern living. Computers are generally involved in work, recreation, healthcare, transportation, entertainment, household management, etc.

Computing systems are often used for data processing. For example, data can be retrieved from a source, have a transform applied to it, and the transformed data stored in a destination location. Illustrating a specific example, a data warehouse or database may store various pieces of relational data. A merge transform may be applied to portions of the relational data to create a mailing list. The mailing list may then be stored as a flat file for later user access at some destination server.

Often this can be performed using integration processes provided by an integration process developer. An integration processes is an executable cross-system process. In particular, a developer may provide an integration process to a system administrator, who can then execute the integration process. This results in data being integrated from one system into another system according to a transform defined in the process. An integration package may include one or more integration processes.

Integration processes may be a set of one or more workflows that can be applied to a data store to access, manipulate and store data. A developer of integration services may sometimes be referred to as an ETL (for extract, transform, and load) developer.

Data integration tools can handle their metadata with dynamically inferred metadata. For dynamically inferred metadata, no metadata is stored in the integration package. In particular, the user does not care about the data type of the source or destination. Illustrating a simple example, if the user wanted to move some data from a flat file to a table, the system will dynamically retrieve the data type column information (metadata) from the flat file and from the table, dynamically discovers the mapping between the source columns to the destination columns, converts the source data to match the target metadata and loads the data into the destination. In cases where the data types does not match, the system in most cases will be able to auto convert the types. For example, the system may be able to convert from a source type string(30) (a string with 30 characters) to a destination type string(25) (a string with 25 characters).

In dynamically inferred metadata, there is no management of data contracts to be done at design time. The contract is inferred at runtime during the execution of the solution. If the destination needs a computed column that depends on a source column, the reference to the source column will be resolved at runtime similar to a programming language that has late binding. The column might or might not exist and if not the system may fail or insert a default value.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for changing an integration process source. The method includes connecting an integration process to a first set of inputs. The first set of inputs may include one or more inputs. The integration process includes one or more data transformation operations using the inputs. The method further includes receiving metadata about one or more of the inputs in the first set of inputs. The metadata about one or more of the inputs in the first set of inputs is cached. The integration process is then connected to a second set of inputs based on the cached metadata about one or more of the inputs in the first set of inputs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality to allow ETL projects that have statically defined metadata during design time to be able to work disconnected from a data source component. Thus, if a data destination or data transformation component is disconnected from the source component, the ETL developer is still able to add a new column that is a computation of a source column. For example, when the upstream flow is temporarily removed, the ETL developer can still edit the component without any upstream flow. In embodiments, the source, transformation, and destination components are arranged in a "pipeline" structure type. In such embodiments, each component element represents one node of the pipeline process.

Embodiments may include functionality to allow ETL projects that have statically defined metadata during design time to define a non-existent column (also called placeholder column) at any point of the flow and allow the placeholder column to flow to a source or data transformation component. The placeholder column may be defined manually by users. In an alternative embodiment, the placeholder column may be inferred from a destination or some other source of required input.

Embodiments may include functionality to cache data type information without having to be connected to a source component to get its name, data type, etc, so that the column information will be available even when the source or destination or one or more transforms is disconnected. Embodiments may allow for creating placeholder columns and propagate them to the source.

Figure 1:
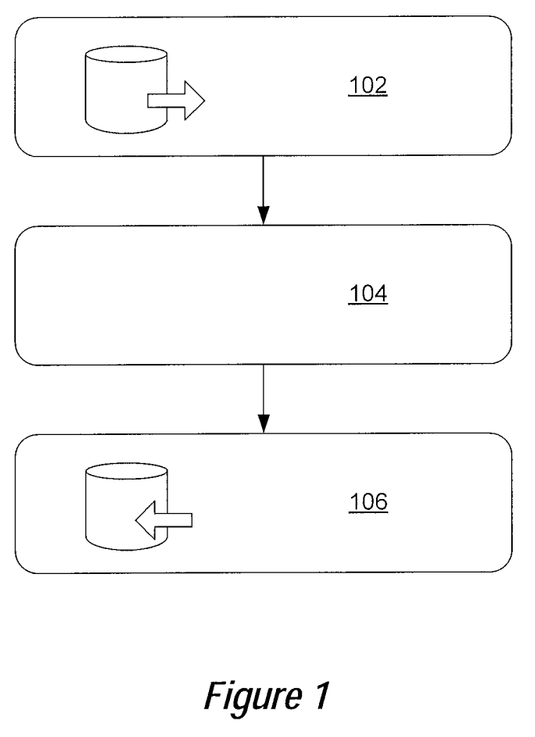
FIG. 1 illustrates a dataflow diagram.

Referring now to FIG. 1, an example dataflow graph 100 from an integration package is illustrated. The dataflow 100 has various components connected by various paths. A component is an entity that produces, transforms or consumes data. For example, the dataflow 100 has a source component 102, a transformation component 104 and a destination component 206. It should be appreciated that a dataflow may have several source components, several transformation components, and several destination components. A path is an entity that connects two components. In embodiments, a "pipeline path" is a type of "path," in which a pipeline path element represents one path of data flow within the pipeline process. For example, a "pipeline task" maps a data flow from an origin to a destination, in which the data flow is passed through a series of components. In further embodiments involving example programmatic implementations, a "PipelinePathType" complex type specifies a single path between two components of the pipeline executable. Additional and/or other complex types are used in other embodiments. The specific names, etc., used herein are offered by way of example.

Figure 2:
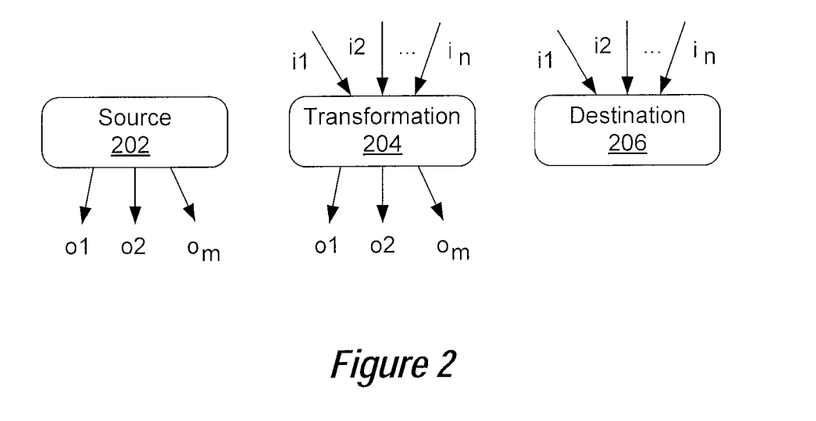
FIG. 2 illustrates examples of various dataflow diagram components.

FIG. 2 illustrates an example source component 202, transformation component 204 and destination component 206. A source component typically has at least two outputs, including at least one data output and one error output. However, embodiments may be implemented where the source component 202 only has a data output. The source component 202 in a work flow defines a source of data. For example, the source component may define a database or a flat file location from where data can be obtained.

A transformation component 204 typically accepts one or more inputs and one or more outputs. In the examples illustrated herein, some examples of inputs and outputs are data structure input or output columns respectively. The transformation component defines how data from sources defined in source components 202 is handled and manipulated. For example, one merge transformation may support two input sources, namely, Input 1 and Input 2. In another example, a Merge Join supports 2 input sources—Left Input and Right Input. In yet another example Multicast typically has multiple output destinations multicasting the same data to different transformation and/or destination components.

A destination component 206 has one or more inputs and typically has zero outputs. The destination component 206 defines where data that has been transformed by the work flow is stored. Example destination components may define databases where data is stored, flat file locations where data is stored, etc.

A dataflow graph is the entire graph of components and paths. This may include disconnected graph components or a graph that includes multiple execution data flow sub-graphs.

Dataflows may be configured to produce an output, such as for example in some embodiments, output columns. An output column is a column that is created in the data flow. For example, in some embodiments, a dataflow includes a source component that retrieves columns from a database and produces new output columns based on the retrieved columns.

Embodiments may include functionality to allow a developer to be able to work with or modify a disconnected component. In particular, some embodiment may include functionality for caching metadata about source and/or destination components which allows development activities to be performed with respect to these components even when the underlying sources and/or destinations are not connected to a dataflow.

Figure 3:
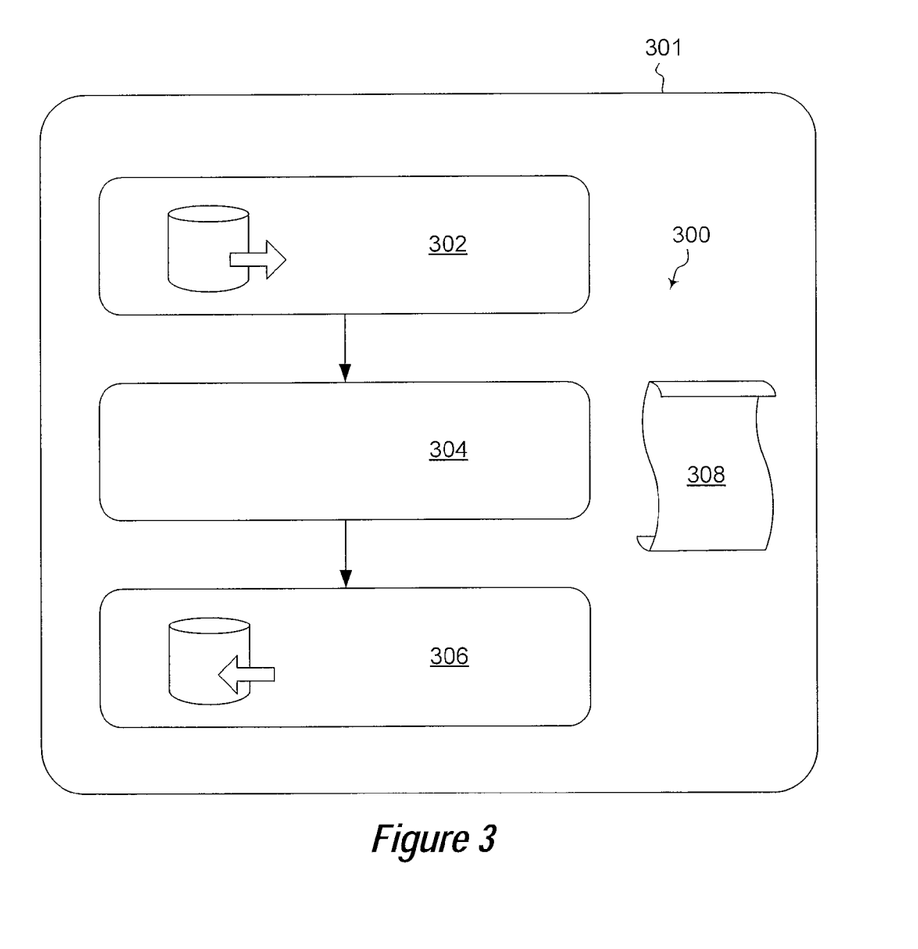
FIG. 3 illustrates another example of a dataflow diagram.

For example, FIG. 3 illustrates a data flow graph 300 of an integration package 301. The data flow graph 300 includes a source component 302, a transformation component 304 and a destination component 306. The source component 302 defines a database source from where data is obtained. The transformation component 304 defines one or more transformations on data obtained from the database defined by the source component. The destination component 306 defines, in this example, a database where transformed data from the transformation component 304 is stored.

The integration package 301 also includes metadata 308 which is cached with the integration package 301. The metadata 308 stores data type information for the database underlying the source component 302. Thus, the dataflow 300 does not need to be actually coupled to the database underlying the source component 302 as a developer works with it, but rather the stored type information can be used to work with the dataflow 300.

As noted, in some previous systems, column usages only contained a reference to the associated upstream output columns. The data type information on a column usage would be retrieved by traversing the upstream flow and looking for the output column of the source underlying a source component that the column usage references, where upstream flow is the set of components and paths from the execution data flow graph that are above the current component. This caused components to become not-editable when the upstream flow is disconnected from the database underlying the source component, in that it cannot find the correspondent output column.

However, some embodiments described herein allow for the implementation of integration packages that allow components to be edited when disconnected. To allow components to be edited when disconnected from a source or destination, in addition to the output column reference, the column usage may also cache the data type information of the output column that is being referenced (name, data type, length, precision, scale, code page, comparison flags, sort key position, etc.), as illustrated by the metadata 308, so that the data type information can be retrieved without being connected to an underlying data source and thus allowing editing the component even if it is disconnected from the upstream flow.

The cached data type information in the metadata 308 can be kept in sync with the data type information of the real output column of a destination defined by the destination component 306. If the data type is changed at the output column, this change is propagated to the downstream flow, where the downstream flow of a current component includes components and paths from the execution data flow graph that are below the current component.

Other operations might trigger this metadata cache update mechanism. For example, in some embodiments re-attaching a path may trigger a metadata cache update. Illustratively, consider an example, where the output column datatype is changed after the path was removed. Subsequently, the path gets re-attached. With the path re-attached, the changed datatype can be updated in the metadata 308.

Figure 4A:
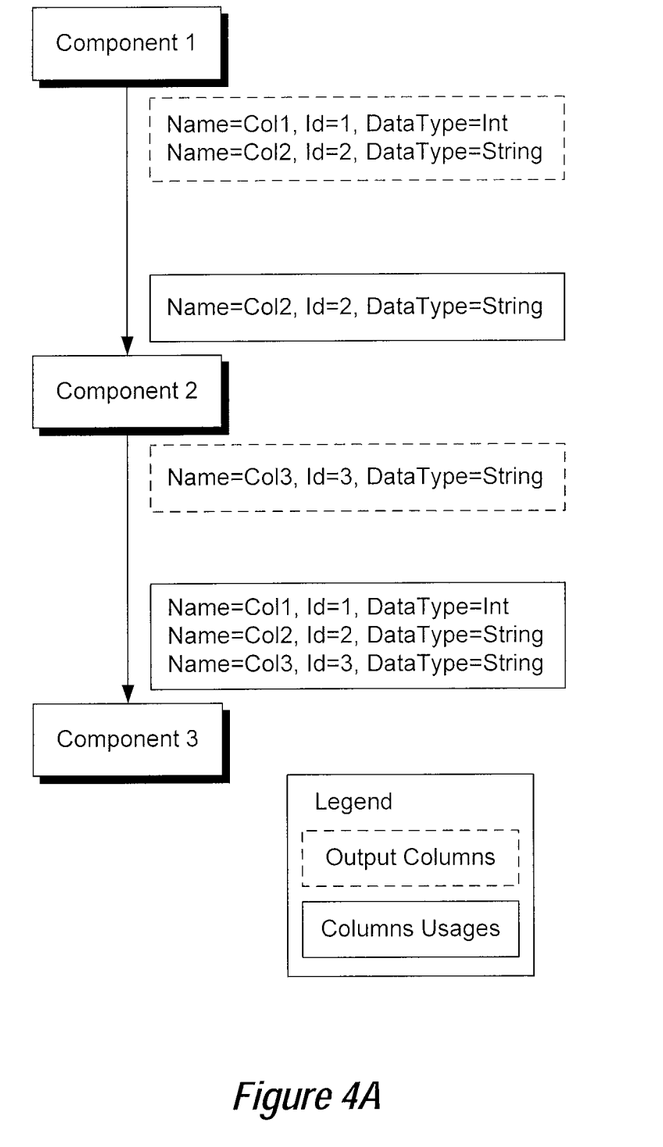
FIG. 4A illustrates an example of a dataflow diagram in conjunction with a caching update scenario example.
Figure 4B:
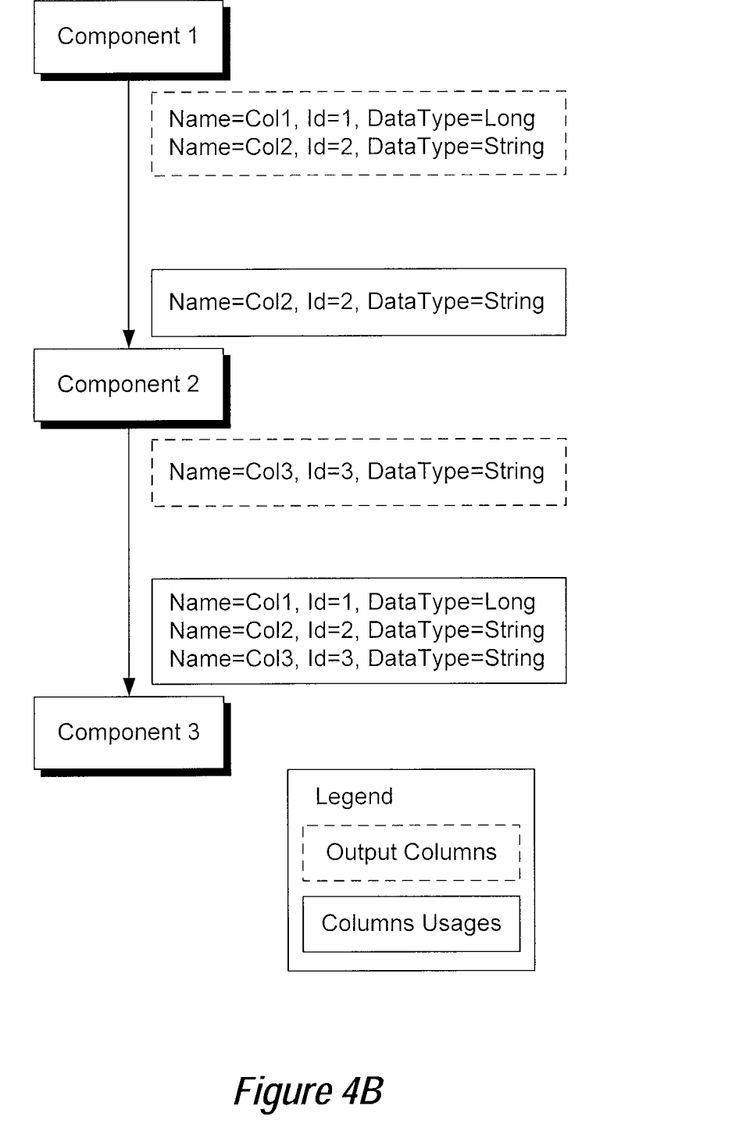
FIG. 4B illustrates an example of the dataflow diagram in FIG. 4A in conjunction with continued illustration of the caching update scenario example.

FIGS. 4A and 4B illustrate a caching update scenario when an output column changes its data type. For simplicity each component is illustrated with a single input and/or single output, but it should be appreciated that embodiments may be implemented where components have a plurality of inputs and/or a plurality of outputs. The dashed boxes in these Figures represent output metadata and the solid boxes represent column usage metadata as shown. FIG. 4A shows the state of the data flow before Col1 changes its data type from Int to Long, as shown in FIG. 4B. In some embodiments, operations are performed to update all column references in the current execution data flow graph to the new value.

Figure 5A:
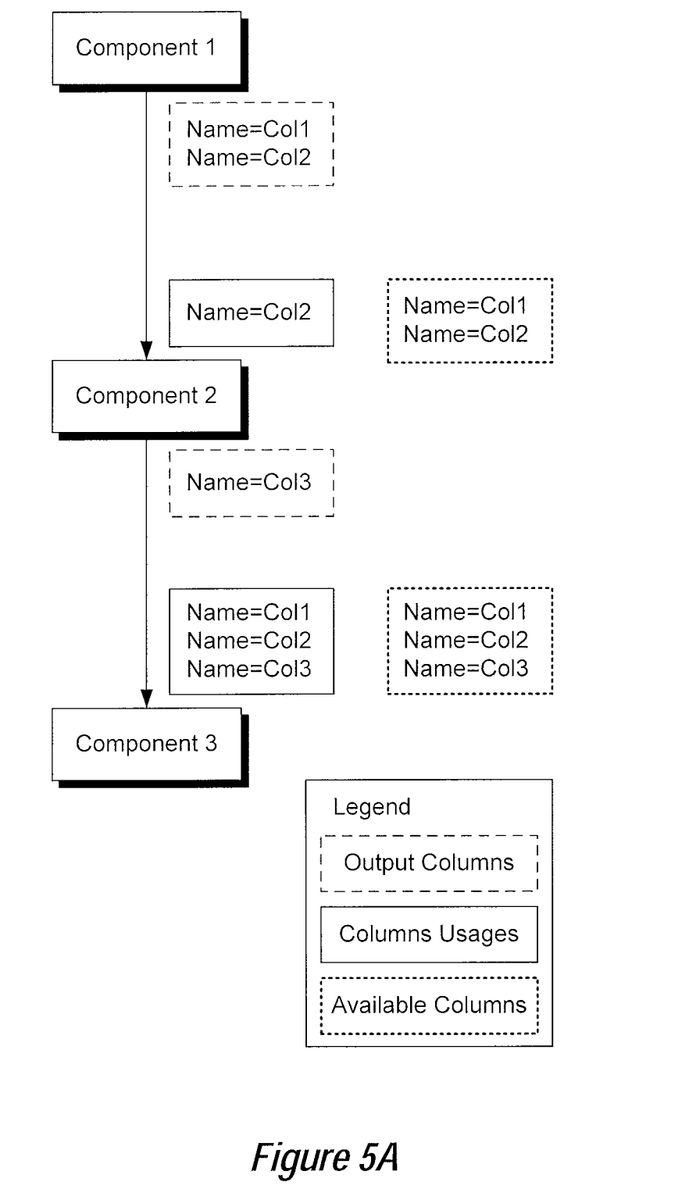
FIG. 5A illustrates an example of a dataflow diagram in conjunction with a caching update scenario example.
Figure 5B:
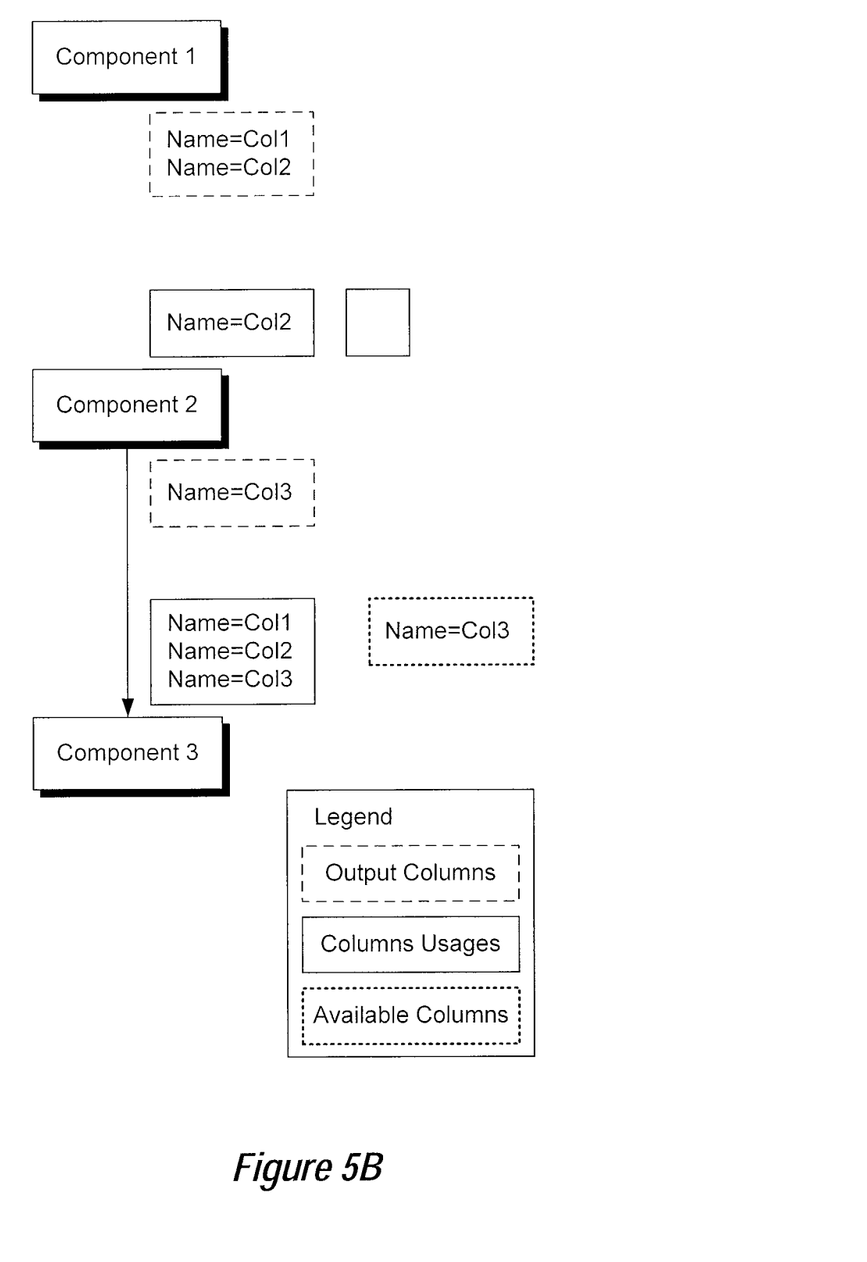
FIG. 5B illustrates an example of the dataflow diagram in FIG. 5A in conjunction with continued illustration of the caching update scenario example.

Embodiments may include functionality for discovering available columns. For example, in some embodiments, the available columns are retrieved by traversing the upstream path and returning all output columns (i.e. all output columns from the current execution data flow). One example is shown in FIG. 5A. Once the path is removed, all upstream columns will be removed from the metadata from the list of available columns at the point of path removal as illustrated in FIG. 5B.

Figure 5C:
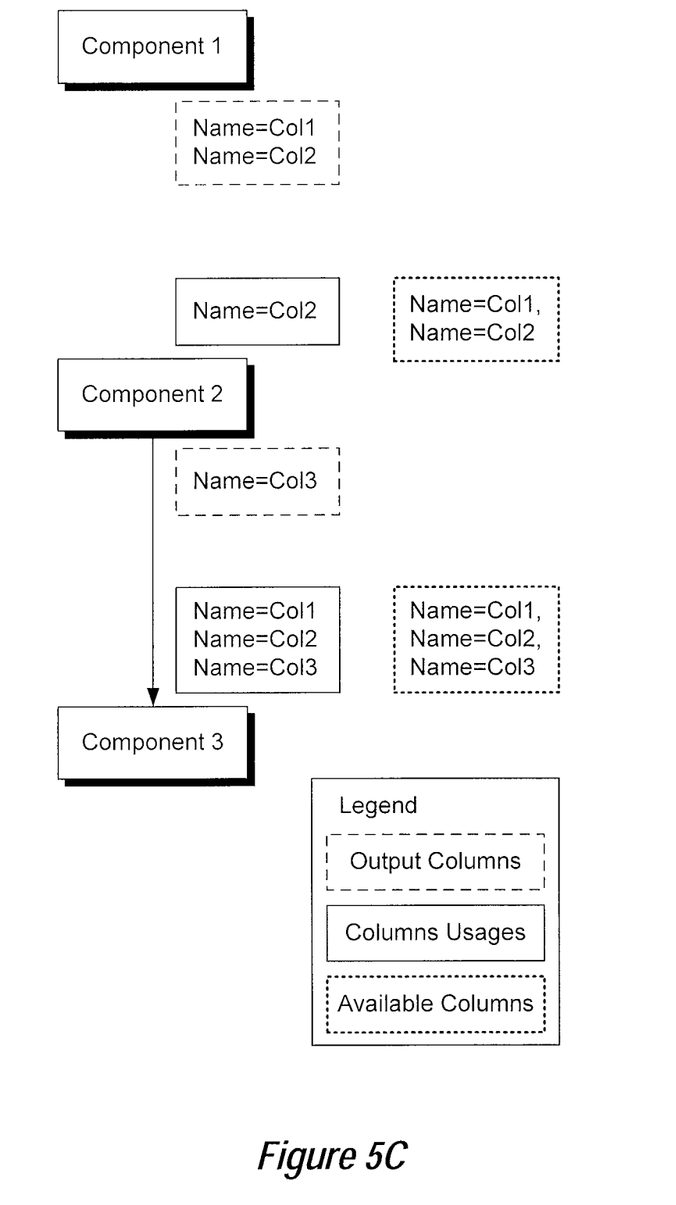
FIG. 5C illustrates an example of the dataflow diagram in FIG. 5A in conjunction with continued illustration of the caching update scenario example.

In some embodiments, where the column usages include the cached data type information, modules that discover the available columns may traverse the execution data flow graph and also adds all column usages that have invalid references to the list of available columns. In particular, embodiments use the output columns that are in the execution tree plus the invalid columns. Later, the search can be pruned once it discovers an input that is not linked to an output. FIG. 5C illustrates an example showing the available columns when column usages with invalid references are considered. Thus, as shown in FIG. 5C, metadata can be maintained about invalid columns, even though a connection is missing from Component 2 to Component 1. This allows for development to be performed on Component 2 and allows Component 2 to be later connected back to Component 1, or to another similar upstream component. While the examples illustrated in FIGS. 5A-5C only illustrated caches names, it should be appreciated that other information may be cached alternatively or additionally. For example, as shown in FIGS. 4A and 4B, additional IDs and data types may be cached as well.

Embodiments may include functionality for implementing and working with placeholder columns. Placeholder columns allow a developer to work from any point in a flow rather than needing to work from source to destination. In particular, many currently implemented ETL systems may require developers to work from source to destination, because the metadata flows from source to the destination. Thus, if the ETL developer discovers that they need a new column in the destination (because it is a required field in the destination table), the developer may need to add the column to the source and let the metadata flow through the data flow to the destination so that the destination can then have a needed column.

However, some embodiments in the present application allow developers to define columns that are not available in the upstream flow by creating a placeholder column that contains a name and data type information (e.g. data type, length, precision, scale, code page, comparison flags, sort key position), etc. The placeholder metadata will be automatically available for all components in the upstream and downstream flow from the execution data flow graph. In some embodiments, this may be accomplished by using the process for discovering available columns illustrated above. These other components in the workflow can be made aware of the placeholder column and they can use the placeholder column as if it were a normal column with metadata obtained from a source underlying a source component. Inside the system, a placeholder column may be treated like a column usage that has an invalid output column reference. Prior to running a data flow, however, the placeholder column will be resolved to some real output column of a source. In some embodiments, this may be done in a fashion similar to how an invalid column usage is to be resolved, as illustrated above. Use of placeholders columns can be useful while designing data flows bottom up (from destination to source) where at the beginning of design time, information about where the column comes from is unknown, but can resolved to the real output column later.

The following now illustrates examples of upstream and downstream flow of placeholder columns. In some embodiments, the placeholder columns are defined a single time and the ETL development system allows the placeholder columns to be visible to the upstream and downstream components. This visibility mechanism may be functional throughout the entire execution graph. For example, embodiments may use the previously disclosed processes for discovering available columns. Embodiments may additionally include functionality for propagating placeholder columns through different execution data flow graphs so they become visible there as well. In some embodiments existing columns are automatically passed through transforms and made available downstream. Alternatively or additionally, in some embodiments, the transformation defines how to pass columns through. For different systems, this might always happen one way or the other. Alternatively, passing of columns may depend on the type of work being done or the type of data being handled.

Illustrating now an example of downstream flow of placeholder columns, each component may properly allow invalid column usages to be propagated to the downstream flow.

For the upstream flow of placeholder columns, various alternatives may be implemented. In particular, in some embodiments, it may or may not be desirable to not have the placeholder column be propagated to the upstream flow. There are two scenarios: In the first scenario, the placeholder column will be produced in the current invalid flow and should not be propagated through the component. In the second scenario, the placeholder column will come from the flow before the current component and should be propagated through the current component. Thus, in some embodiments, a user, or setting may explicitly invoke operations for upstream flow of placeholder columns. For example, a user may interact with a user interface, such as a Graphical User Interface (GUI) and select which invalid columns usages will flow to the upstream graph portions. Once it is known which columns will be propagated, corresponding placeholder columns will be created in the component column usages and output columns will be created below the component so that the downstream flow becomes valid for the columns that were selected, inasmuch as a user selected which columns will come from the upstream flow.

Embodiments may be implemented where each component includes a propagation mechanism to propagate invalid column usages from the downstream flow to the upstream flow for cases where the placeholder column needs to flow through different execution data flow graphs. Furthermore, an output column can be created for each selected invalid column usage and all selected invalid column usages in the downstream flow can map to the new output columns created.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
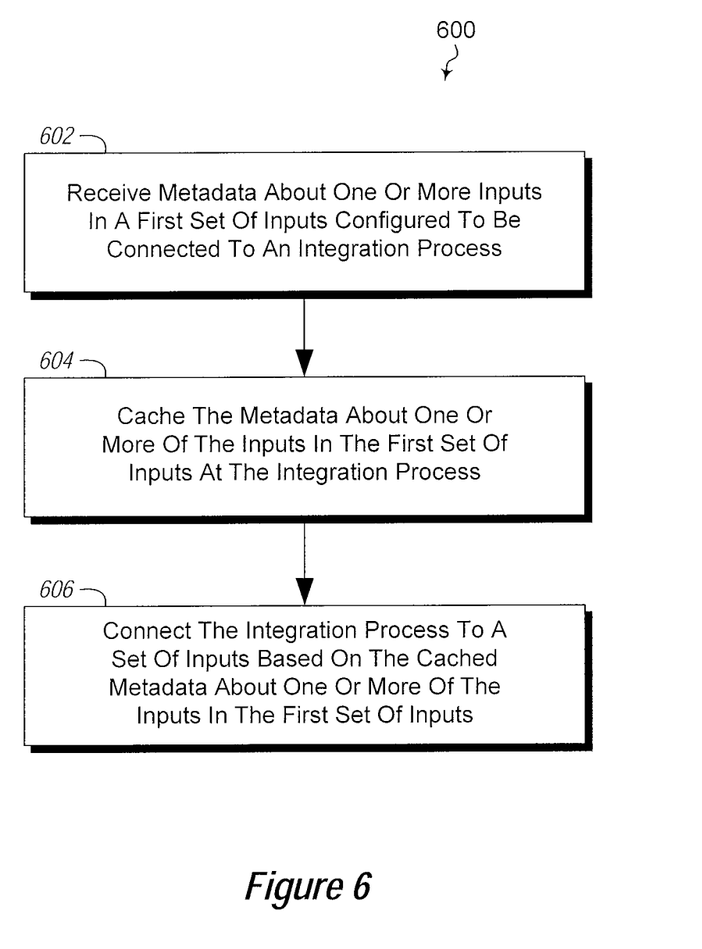
FIG. 6 illustrates a method of connecting an integration process source.

Referring now to FIG. 6, a method 600 is illustrated. The method 600 may be practiced in a computing environment. The method includes receiving metadata about one or more inputs in a first set of inputs configured to be connected to an integration process (act 602). The integration process includes one or more data transformation operations. The metadata may be received from any of a number of different ways. For example, in one embodiment, the metadata may be received as a result of connecting the integration process to a set of inputs, where metadata flows from the set of inputs to the integration process. Alternatively or additionally, metadata may be received about an output component of the integration process. Alternatively or additionally, metadata may be received from a transform component of a different integration process. Alternatively or additionally, metadata may be received from an integration process developer directly providing the metadata, such as by entering the metadata into a user interface for developing integration processes. Alternatively or additionally, metadata may be received about a placeholder column. In some embodiments, the metadata includes information describing columns from one or more sources. The sources may be actual sources or hypothetical sources, which are not necessarily known to actually exist.

The method 600 further includes caching the metadata about one or more of the inputs in the first set of inputs at the integration process (act 604). In particular, the metadata may be cached and used even though all or portions of the integration process are not connected to a source including inputs that provide metadata.

The method 600 further includes connecting the integration process to a set of inputs based on the cached metadata about one or more of the inputs in the first set of inputs (act 606). However, the metadata of the new inputs that are connected may not exactly (or even nearly) match that of the cache. In some embodiments, connecting the integration process to a set of inputs includes a user selecting portions of a source based on the metadata and mapping the portions to inputs from the first source. For example, a system administrator can manually connect inputs of a transformation 204 to a source 202 using the cached metadata as a guide as to what inputs from a source to connect to inputs of a transformation. In some embodiments, connecting the integration process to a set of inputs includes automatically selecting a source based on the metadata. For example, automatically selecting a source based on the metadata may be performed by selecting a source based on an input name. Illustratively, inputs may be selected that have the same name as an input described in the metadata. Alternatively or additionally, inputs may be selected that have a name similar to an input described in the metadata.

Embodiments of the method 600 may be practiced to further include sharing metadata from the integration process with a different integration process. For example, if two different integration processes will be performing different transformations on the same data, the metadata from one of the integration processes can be shared with the other because the sources are the same (or similar).

Some embodiments may include error handling functionality. For example, embodiments, of the method 600 may include providing a user with information based on the metadata about a possible input to connect to from the set of inputs. For example, if there would be an error when executing an integration process, embodiments may, rather than indicating an error, identify a likely candidate for a missing input based on the metadata. For example, if the metadata seems to indicate that a "name" column should be included as an input, but a name input is missing from a mail merge integration process, the system can indicate that a user may want to attach a name input to the integration process.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer. However, physical computer readable storage media excludes propagation media.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of performing development activities on a data flow, the method comprising:
   receiving metadata about the data flow, wherein the data flow comprises information regarding a data type input data from a source device, definitions of data manipulation by the transformation component, and a data type of output data to a destination device;
   caching, by a transform device, the metadata to form cached metadata, the cached metadata including the type of the input data and the type of the output data;
   determining that the source device is not in communication with the transform device;
   and after determining that the source device is not in communication with the transform device:
      performing, by the transform device, development activities on the data flow by using the cached metadata to identify the type of at least one datum of the input data, wherein performing development activities includes altering data transform applied to the input data to form a new transform;
      applying, by the transform device, the new transform to form transformed data;
      transmitting the transformed data to the destination component; and
   after determining that the source component is no longer in communication with the transform device, determining that the source component is again in communication with the source device.

2. The method of claim 1, wherein the metadata describes columns from the source device.

3. The method of claim 1, further comprising receiving a user selection to map the input data to the output data.

4. The method of claim 1, Wherein identifying a type of at least one datum of the input data occurs automatically.

5. The method of claim 4, further comprises automatically selecting the at least one datum of the input data and mapping the at least one datum to a destination of the destination device.

6. The method of claim 5, wherein the automatically selecting occurs by identifying the at least one datum as a type that matches a type of an at least one datum in the output data.

7. The method of claim 1, further comprising providing a user with information based on the metadata about the source device.

8. The method of claim 1, further comprising updating the cached metadata after determining that the source component is again in communication with the source device.

9. The method of claim 1 wherein the information regarding input data comprises data type.

10. The method of claim 1 wherein the information regarding out data comprises data type comprises metadata about data destination related to the one or more components in the data flow.

11. The method of claim 1 wherein the metadata comprises column header information.

12. One or more physical computer readable storage media comprising computer executable instructions that when executed by one or more processors cause the following to be performed:
    receiving metadata about a data flow, wherein the data flow comprises information regarding input data from a source device, and further wherein the data flow comprises information regarding output data to a destination device;
    caching the metadata to form cached metadata, the cached metadata including the type of the input data and the type of the output data;
    determining that the source device is not in communication with the transform device;
    performing development activities on the data flow by using the cached metadata to identify the type of the input data, wherein performing development activities includes altering a data transform applied to the input data to form a new transform;
    applying, by the transform device, the new transform to form transformed data;

transmitting the transformed data to the destination component; and after determining that the source component is no longer in communication with the transform device, determining that the source component is again in communication with the source device.

13. The one or more physical computer readable media of claim 12, wherein receiving metadata about one or more components in a data flow occurs as a result of connecting to the data flow.

14. The one or more physical computer readable media of claim 12, wherein receiving metadata is received through a network.

15. The one or more physical computer readable media of claim 12, wherein the metadata further comprises information related to a transform device.

16. The one or more physical computer readable media of claim 12, wherein the information related to a transform comprises transform outputs.

17. The one or more physical computer readable media of claim 12, wherein receiving metadata is performed by receiving metadata from an integration process developer.

18. The one or more physical computer readable media of claim 12, wherein receiving metadata is performed by receiving metadata about a placeholder column.

19. In a computing environment, a method of changing an integration process source, the method comprising:

receiving metadata about the data flow by traversing an upstream path of the data flow and returning available columns from the upstream path; wherein the data flow comprises information regarding input data from a source device, and further wherein the data flow comprises information regarding output data to a destination device;

caching the metadata about one or more components in the data flow including information about the available columns;

determining that the source device is not in communication with the data flow;

after determining that the source device is not in communication with the data flow, adding at least one additional placeholder columns to the cached metadata based on a required column in a destination device; and performing, by a transform device, development activities by using the cached added metadata about placeholder columns, wherein performing development activities includes altering a data transform applied to the input data to form a new transform;

transmitting the new transform to a destination component.

* * * * *